No. 868,081. PATENTED OCT. 15, 1907.
C. E. FREAR.
CONTROLLER FOR MOTOR VEHICLES.
APPLICATION FILED JAN. 2, 1907.
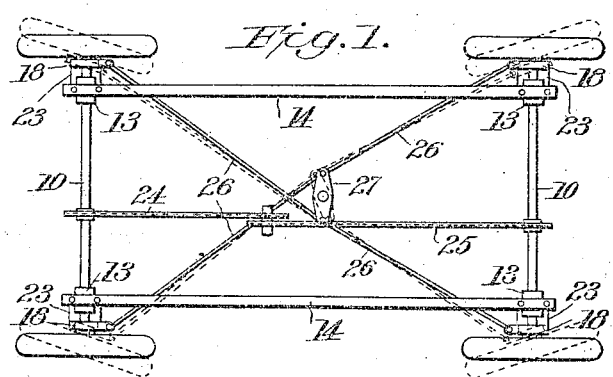
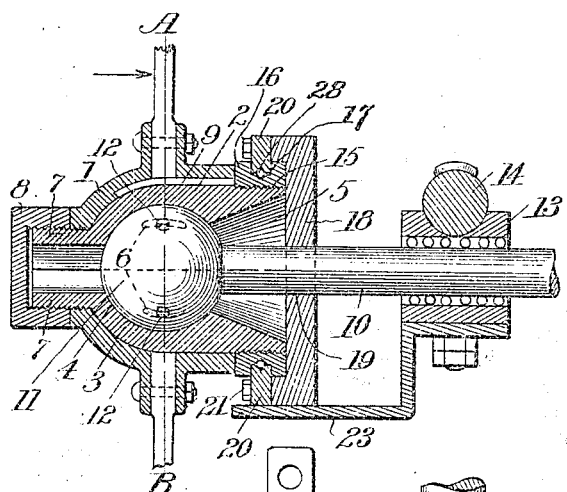
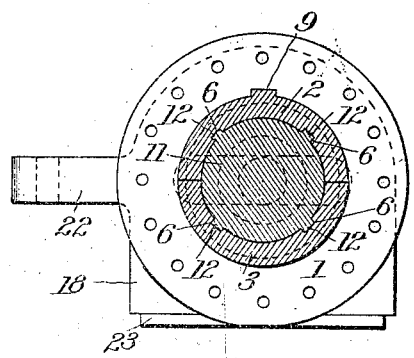
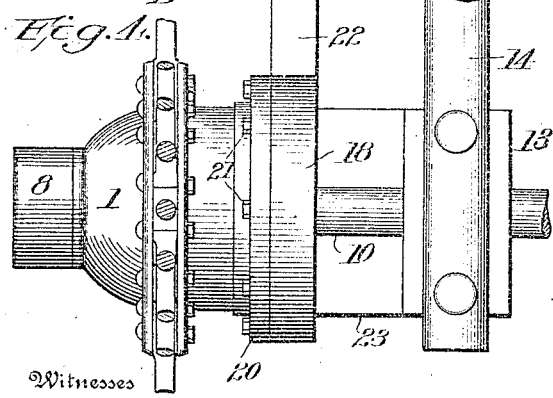
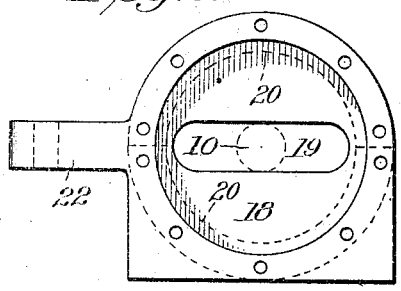
Witnesses
Inventor
Clark E. Frear
Attorney

UNITED STATES PATENT OFFICE.

CLARK E. FREAR, OF LAKE WINOLA, PENNSYLVANIA.

CONTROLLER FOR MOTOR-VEHICLES.

No. 868,081.　　　　Specification of Letters Patent.　　　　Patented Oct. 15, 1907.

Application filed January 2, 1907. Serial No. 350,458.

*To all whom it may concern:*

Be it known that I, CLARK E. FREAR, a citizen of the United States, residing at Lake Winola, in the county of Wyoming and State of Pennsylvania, have invented a certain new and useful Improvement in Controllers for Motor-Vehicles, of which the following is a full, clear, and exact description.

The object of the invention is to provide simple means for steering or controlling the direction of movement of motor vehicles.

In the invention the wheels are provided with a divided axle-box having grooves in its cavity and adapted to receive a ball on the end of the axle to constitute a universal connection between said box and axle. The ball has pins or lugs to fit the grooves in the axle-box and thereby to rotatably connect the wheel and axle. The axle and axle-box are further connected by a sleeve fitted upon the axle-box and provided with an external circumferential groove or flange, to receive an inwardly projecting flange on a slotted plate through which the axle passes, this plate being provided with means for shifting it, whereby the wheels supplied with these features may be turned to control the direction of movement of the vehicle, all as I will proceed now more particularly to set forth and finally claim.

In the accompanying drawings, illustrating the invention, in the several figures of which like parts are similarly designated, Figure 1 is a plan view of a portion of an automobile or motor-vehicle frame, with the invention applied thereto. Fig. 2 is a vertical longitudinal section, on a larger scale, of the wheel-hub and a portion of the frame, with the controller mechanism applied thereto. Fig. 3 is a vertical section, on a larger scale, taken in the plane of line A B, Fig. 2, and looking in the direction of the arrow, the spokes of the wheel being omittted. Fig. 4 is a plan view of the parts shown in Fig. 2. Fig. 5 is an elevation of the controller-plate.

The hub 1 of the wheel is provided with an axle-box constructed of halves 2 and 3, preferably united horizontally and having an interior spherical cavity 4 terminating in a circular flaring opening 5 upon the inner side. The cavity 4 is provided with a suitable number of fore and aft grooves 6. The outer portions of the axle box sections 2 and 3 are formed to constitute a boss or projection 7, which projects through an opening in the hub, and is adapted to receive a fastening nut 8 whereby the wheel is detachably secured to the axle-box. Any suitable means may be provided for locking the axle-box within the hub, and as one illustration, a spline or key 9 is made integral with the section 2 of the axle-box and adapted to fit in a corresponding groove in the hub.

The axle 10 is provided at its end with a ball 11 fitted snugly within the cavity 4 of the axle-box and provided with pins or lugs 12 adapted to enter the grooves 6 in said cavity to thereby lock the axle and axle-box together, whereby the wheel may be turned by the rotation of the axle.

The grooves 6 in the axle-box are of sufficient width and such curvature with relation to the pins or lugs 12 to permit a free movement of the axle-box about the ball 11, in shifting the wheel for steering purposes.

The axle is preferably mounted in ball-bearing boxes 13 carried by the frame members 14.

The inner ends of the axle-box sections 2 and 3 are screw-threaded, as at 15, and are adapted to receive a screw-threaded collar or sleeve 16 whereby the axle-box sections are more firmly united, and said collar 16 is provided with an external circumferential groove 17.

A controller-plate 18 having a horizontal slot 19 is fitted upon the axle 10 adjacent to the inner end of the hub or axle-box of the wheel, and is provided with a flange 20 secured thereto by means of bolts 21 or otherwise, and said flange 20 projects inwardly and enters the groove 17 in the sleeve or collar 16 to permit free rotatio nof the wheel with relation to the controller-plate and its flange. It will be observed that the horizontal slot 19 in the controller-plate 18 snugly fits the axle of the vehicle and permits a lateral longitudinal movement of the wheel, and at the same time serves as a support for the wheel to prevent vertical movement or tilting of the wheel. The controller-plate 18 is also provided with a lateral lug or projection 22 adapted to be connected with any suitable steering gear.

In order to afford an additional support for the controller-plate and to prevent vertical movement or wabbling of the wheel, a bracket or step plate 23 is rigidly secured, preferably, to the under-side of the ball-bearing boxes 13, and projects beneath and engages the lower straight edge of the controller-plate 18 and is made of sufficient width t support said plate in its movements.

As shown in Fig. 1, preferably all of the wheels of the vehicle are provided with the features of this invention, and by this provision, it is possible to utilize all four of the wheels of the vehicle as driving and steering wheels. The front and rear axles are geared with the driving power (not shown) by chains 24 25.

When all of the wheels are utilized as steering wheels, the controller-plates of the several wheels are connected by means of a set of controlling levers 26 operated from a steering-post 27. By this arrangement, the front wheels and rear wheels may be shifted right oblique and left oblique, respectively, or vice versa, in order to steer the vehicle in the desired direction.

The wheels turn freely within the controller-plates, and by movement of the steering levers 26 in one or the other direction, the controller-plates are shifted upon the axles and their supporting plates 23 and carry with them the wheels, the circular flaring openings 5 in the axle-boxes permitting the movement of the wheels about the axles in order to steer the vehicle in the desired direction.

In order to reduce friction between the controller-plates and the wheels, the connection between these parts may be provided with any suitable arrangement of anti-friction bearings, and as an illustration, I have shown in Fig. 2, balls 28 arranged between the flange 20 of the controller-plate and the bottom of the groove 17 in the sleeve 16 of the axle-box.

I wish to be understood as not limiting my invention to the exact details of construction herein shown and described, as the same may be altered in various particulars and still be within the scope of my invention.

What I claim is:—

1. A controller for motor vehicles, having a pivotally mounted wheel whose hub has an external circumferential groove upon its inner end, a controller-plate movably mounted upon and engaging the axle of said vehicle and provided with an inwardly projecting flange engaging said groove, and means for shifting said plate.

2. A controller for motor vehicles, having a pivotally mounted wheel whose hub has an external circumferential groove upon its inner end, a controller-plate having a horizontal slot adapted to receive and engage the axle of the vehicle and an inwardly projecting flange engaging the groove in the hub, and means for shifting the said controller-plate.

3. A controller for motor vehicles, having a pivotally mounted wheel whose hub has an external circumferential groove upon its inner end, a controller-plate having a horizontal slot adapted to receive and engage the axle of the vehicle and to permit horizontal movement of said controller-plate and also serving as a support for the wheel against vertical tilting movement, an inwardly projecting flange on said controller-plate in engagement with the groove in the hub to permit rotation of the wheel, and means for shifting said controller-plate.

4. A controller for motor vehicles, comprising a pivotally mounted wheel whose hub has a circumferential groove upon its inner end, a controller-plate having a horizontal slot adapted to receive and engage the axle of the vehicle and to permit horizontal movement of said controller-plate and also serving as a support for the wheel against vertical tilting movement, a flange on said controller-plate in engagement with the groove in the hub and permitting rotation of the wheel, a supporting-plate for said controller-plate rigidly secured to the frame of the vehicle, and means for shifting said controller-plate.

5. In a motor vehicle, a wheel having a hub, a horizontally divided axle-box secured in said hub and provided with an interior spherical cavity and a circular flaring opening, longitudinal slots in said spherical cavity, an axle provided with a ball upon its end adapted to fit in the spherical cavity of the axle-box and having pins or lugs upon its surface adapted to enter the grooves in said cavity to lock the axle and wheel together, a sleeve or collar fitted upon the inner end of said axle-box to lock the parts thereof together and provided with an external circumferential groove, combined with a controller-plate having a horizontal slot adapted to fit upon and engage the axle of the vehicle and having an inwardly projecting flange loosely engaging the groove in said collar or sleeve, and means for shifting the said controller-plate for turning the wheel in either direction.

6. In a motor vehicle, front and rear axles, wheels universally mounted upon said axles and rotatably connected therewith, means for driving both of said axles, the hubs of said wheels having circumferential grooves upon their inner ends, controller-plates having horizontal slots adapted to fit upon and engage the axles, flanges on said controller-plates loosely engaging the grooves in said hubs, supporting-plates for said controller-plates rigidly secured to the vehicle frame, steering levers connected with said controller plates, and means for operating said steering levers, whereby the front and rear wheels may be turned right-oblique and left-oblique, respectively, or vice versa.

7. In a motor vehicle, front and rear axles, wheels universally mounted upon said axles and rotatably connected therewith, means for driving both of said axles, the hubs of said wheels having circumferential grooves upon their inner ends, controller-plates having horizontal slots adapted to fit upon and engage the axles, flanges on said controller-plates loosely engaging the grooves in said hubs, anti-friction devices arranged between said controller-plates and said hubs, supporting-plates for said controller-plates rigidly secured to the vehicle frame, steering levers connected with said controller-plates, and means for operating said steering levers, whereby the front and rear wheels may be turned right-oblique and left-oblique, respectively, or vice versa.

In testimony whereof I have hereunto set my hand this 1st day of January A. D. 1907.

CLARK E. FREAR.

Witnesses:
CHARLES F. SNOVER,
ROBERT H. STARK.